Figure 1:
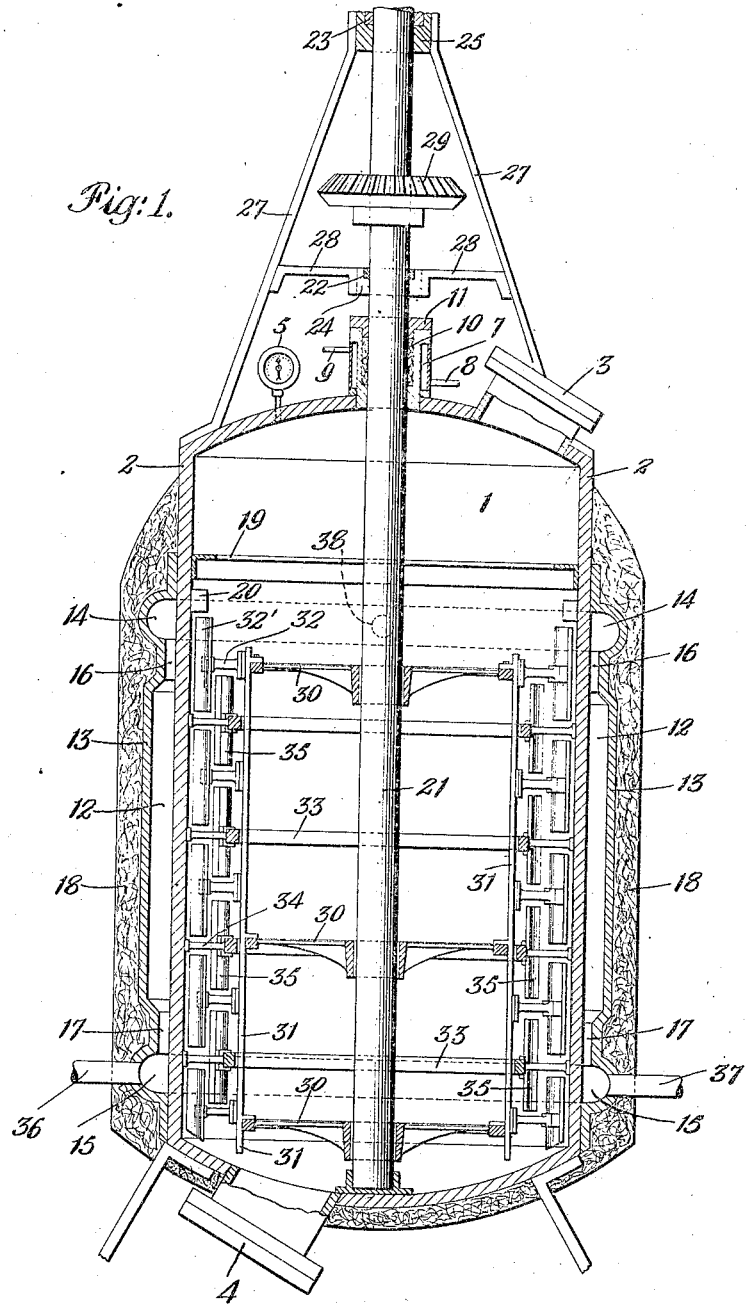

June 1, 1926.

F. X. GOVERS 1,587,115

PROCESS AND APPARATUS FOR THE HEAT TREATMENT OF CHEMICAL COMPOUNDS

Filed August 8, 1923   3 Sheets-Sheet 1

Inventor
Francis X Govers
By his Attorney
Maxwell Barus.

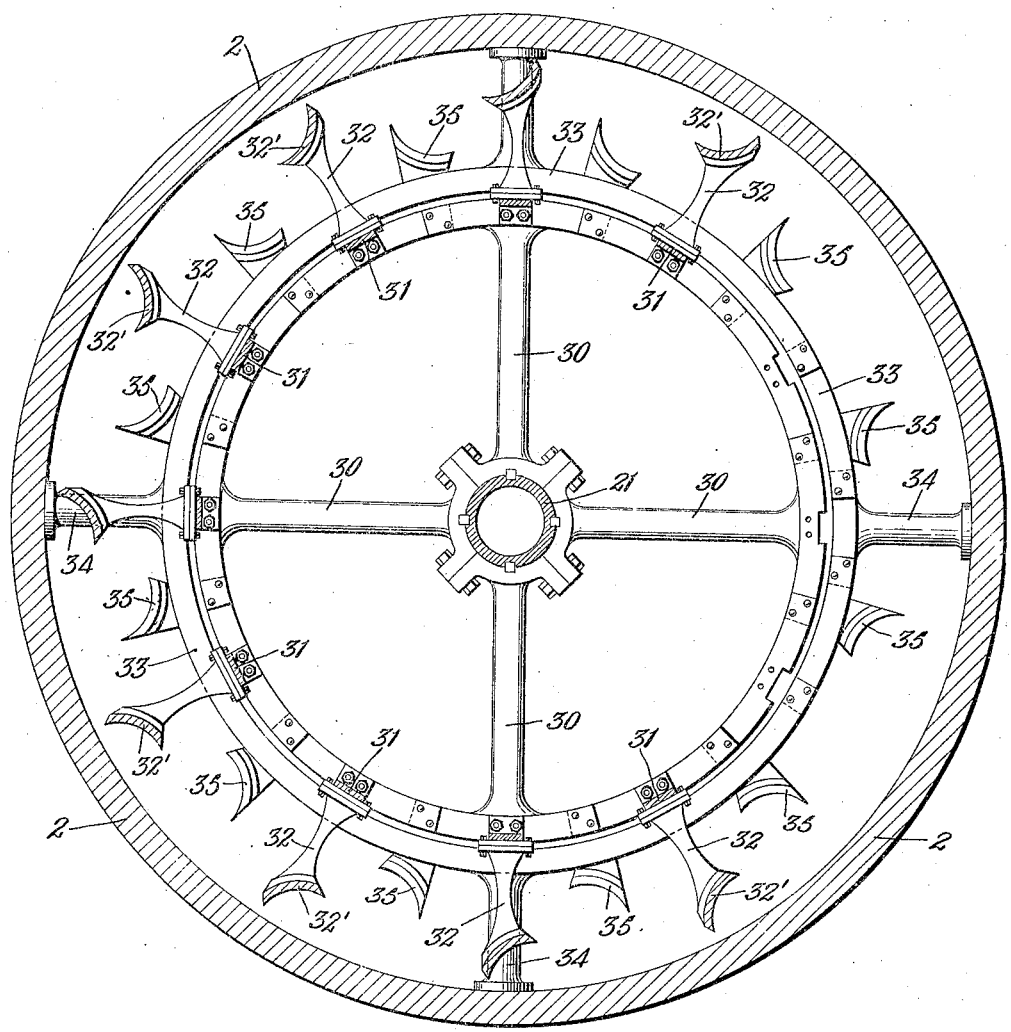

Patented June 1, 1926.

1,587,115

UNITED STATES PATENT OFFICE.

FRANCIS X. GOVERS, OF NEW YORK, N. Y.

PROCESS AND APPARATUS FOR THE HEAT TREATMENT OF CHEMICAL COMPOUNDS.

Application filed August 8, 1923. Serial No. 656,338.

In the treatment of liquid chemical compounds by means of heat, either at reduced, atmospheric or increased pressures an even application of the heat is most important.
All reactions, whether of decomposition, combination, addition or substitution have their optimum conditions and the optimum condition is in many cases most narrow.
Not only must a compound or a mixture thereof be heated to a definite point to obtain a desired result but it is most necessary if desired yields either in quality or quantity are to be produced, that a desired definite point be not exceeded.
Small temperature differences have marked effects on the course of many reactions.
Chemical reactions are many times most complex and the endothermic reaction of decomposition many times is followed very closely by the exothermic reaction of combination. In the treatment of masses of compounds the even distribution of heat is most difficult as many of the compounds un25 der treatment are very poor conductors of heat and convection currents even if present to an appreciable extent are very apt to produce channeling effects.
Thus in mass reactions the effect would be most uneven and the result, both as to kind and amount of product produced, different in the center of the mass than that against or in close proximity to the heated surface. In order to supply heat there must be a temperature difference between the heating surface and the material heated and many times in order to supply the necessary thermal units for the work to be accomplished the temperature differences have to be considerable, in order to supply sufficient heat with the amount of heat units, transferable by the surface used. Since by mere convection currents alone it is well known that even heating cannot be obtained in a liquid mass, it is customary to stir or agitate the liquids under treatment and by a rapid mixing and changing of the parts of the liquid, attempt regulation of the temperature of the mass as a whole. Tempera50 ture of the mass as a whole, however, does not ordinarily denote that there is any relation between the then mean temperature and temperatures that existed in parts of the mass.
In the case of great temperature differences, parts of the mass may have been heated far above the desired point and still there may be no indication of this by mass temperature changes.
The control of the course of the reaction and the prevention at least in part of secondary reactions can be effected by the use of small temperature differences and evenly heated surfaces for supplying the necessary heat. In the use of small temperature differences it becomes of the greatest importance that the utmost advantage be taken of every square inch of heating surface and many devices are in use for the rapid agitation and thorough mixing of the materials or liquids under treatment.
I have discovered, however, that in none of the methods in use or proposed for use, have the desired results been obtained. Stirrers that are efficient in their agitation and mixing effect are sadly deficient in their advantageous use of the heated surface. Stirrers that give at certain temperatures fairly good heat transfer at others are sluggish in this respect and other types of stirrers create an eddy swirl that keeps certain parts of the mass in too prolonged contact with the heated surface, the reaction products not being allowed a means of escape. Secondary products are formed.
I have discovered that not only must there be a good flow of material past the heating surface but the flow must be such as to present new and ever-changing particles or streams of the mass to the influence of the heated surface.
I have discovered that in many reactions the retention of reaction products at the heated surface will cause secondary undesired reaction whereas the quick removal of such primary reaction products will result in desired stable products that are not affected by further heating at the temperatures used.
I have discovered that impinging streams rightly directed will give not only the desired heat transfer but in addition thereto will keep the heating surface free from accretions, will prevent the retention of parts of the mass, will facilitate the freeing of gaseous products, if any are formed, and as herein described will utilize to a greater extent than any other method the full area of heating surface and will permit the use of smaller temperature differences in heating while retaining to a great extent the output of products.

Figure 2:
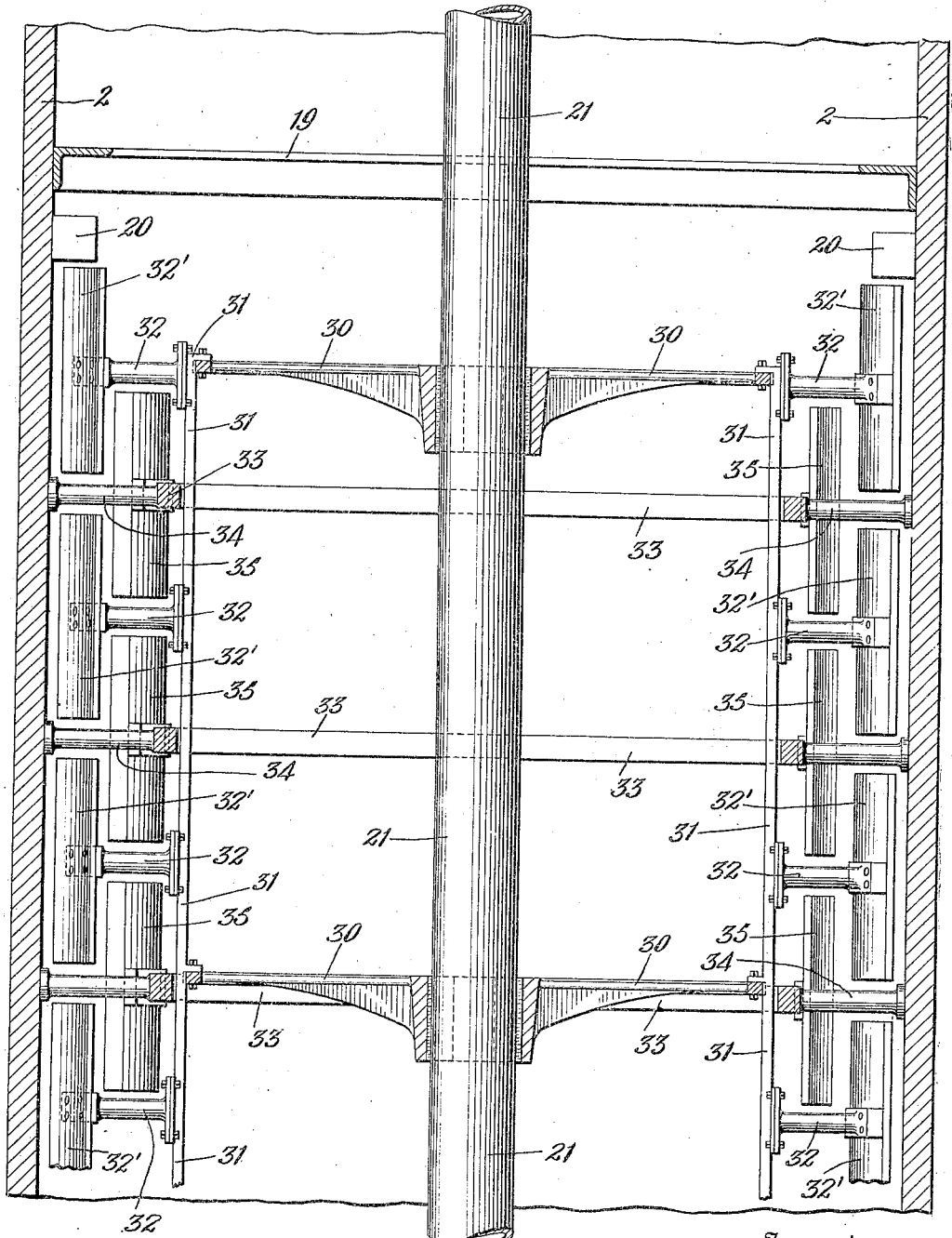

Referring to the drawings,

Fig. 1 is a sectional assembly elevation;
Fig. 2 is an enlarged section in elevation showing details of stirrer; and
Fig. 3 is a horizontal section of the stirrer.

1 is an autoclave having steel walls 2 provided with top opening 3 and bottom opening 4 and a pressure gauge 5. To the steel walls 2 is welded a steel forging 6 having cooler space 7 provided with pipes 8 and 9 for the circulation of a cooling medium to cool the stuffing box 10 which has a gland 11 with means of adjusting packing. The heating fluid space 12 formed by walls 2 and 13 is provided with annular heads 14 and 15 and restricted spaces 16 and 17 to equalize and direct the flow of heating fluid. Wall 13 has an insulating covering 18.

Fastened to the inside of still walls 2 are ring 19 and deflecting blades 20.

Through the center of the autoclave 1, the stuffing box 10 and combined thrust, radial bearing 22 and radial bearing 23, passes a shaft 21. Bearings 22 and 23 are recessed in castings 24 and 25 which are supported and held by arms 27 and 28. Shaft 21 is rotated by means of gear 29. To the shaft 21 are fastened ring spiders 30. Bolted onto the ring spiders are steel blades 31 to which are attached the rotating arms 32 and blades 32'. A ring 33 is attached by means of arms 34 to the steel wall 2, the ring 33 being provided with starting blades 35.

Heating fluid is supplied to the space 12 by means of pipes 36 and 37 and withdrawn by means of pipes 38 or 39 or the direction of flow may be reversed.

In the operation the liquid or material under treatment is taken up by the revolving blade 32' and moved partly in the direction of rotation and partly by centrifugal forces toward the tip or upper end of the blade 32'. The material set in motion by the rotating blade comes in contact with the stationary blade 35 and such part of the stream as has a swirling motion is directed toward and against the heated surface 2. The shape of the blade 32' is such that it affords an easy escape from the heated surface of the impinged liquid material. It will thus be seen that extending through the entire length of the heated zone is a constant succession of impinged streams not only presenting continuous fresh particles of material to the heated surface but by reason of such impingement causing a continuous displacement of the particles previously in contact with the heated surface. In addition thereto any gases formed by the reaction are continuously swept away from the surface and it will be seen that where combination or recombination occurs it can take place without formation of undesired secondary products due to overheating.

It will be obvious from the foregoing that many modifications may be made in the details of the apparatus and process without departing from the spirit and scope of my invention.

What I claim is:

1. In the process of heating a fluid charge in a vessel having substantially circular cross section and having its circular walls heated, the step of so stirring the charge as to continuously impinge substantially radially directed streams of ever changing portions of the charge against the heated surface.

2. In the process of heat treating a fluid charge in a vessel having substantially circular cross section and having its circular walls heated, the step of so stirring the charge as to continuously impinge substantially radially directed streams of ever changing portions of the charge against the heated surface so as to subject such portions momentarily to the action of the heating surface and displace therefrom reaction products formed.

3. In the process of heat treating a charge in a vessel having substantially circular cross section and having its circular walls heated, the step of preventing accretions at the heated surface by so stirring the charge as to continuously impinge substantially radially directed streams of ever changing portions of the charge against the heated surface with sufficient impact to wash away solid reaction products tending to adhere thereto.

4. In an apparatus for heat treating a charge, a vessel of substantially circular cross-section, means for heating at least a portion of its circular walls and a stirring device therein comprising axially disposed rotatable blades positioned near to but out of contact with the walls and axially disposed vanes positioned further from the walls than the movable blades, the blades and vanes being so shaped as to cooperate to impel and reflect the charge substantially radially.

FRANCIS X. GOVERS.